US007870353B2

(12) United States Patent
Correl

(10) Patent No.: US 7,870,353 B2
(45) Date of Patent: Jan. 11, 2011

(54) COPYING STORAGE UNITS AND RELATED METADATA TO STORAGE

(75) Inventor: Stephen F. Correl, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 801 days.

(21) Appl. No.: 11/204,310

(22) Filed: Aug. 15, 2005

(65) Prior Publication Data

US 2007/0038822 A1  Feb. 15, 2007

(51) Int. Cl.
G06F 12/00 (2006.01)
(52) U.S. Cl. .................... 711/162; 711/E12.103
(58) Field of Classification Search .................. 711/162
See application file for complete search history.

(56) References Cited

U.S. PATENT DOCUMENTS

| | | | |
|---|---|---|---|
| 6,732,244 B2 | 5/2004 | Ashton et al. | |
| 6,996,682 B1* | 2/2006 | Milligan et al. | 711/141 |
| 7,085,785 B2* | 8/2006 | Sawdon et al. | 707/204 |
| 7,130,957 B2* | 10/2006 | Rao | 711/3 |
| 7,197,520 B1* | 3/2007 | Matthews et al. | 707/204 |
| 2003/0140204 A1 | 7/2003 | Ashton et al. | |
| 2003/0187887 A1 | 10/2003 | Beal | |
| 2003/0217077 A1* | 11/2003 | Schwartz et al. | 707/200 |
| 2004/0221125 A1 | 11/2004 | Ananthanarayanan et al. | |
| 2004/0243775 A1 | 12/2004 | Coulter et al. | |
| 2004/0243776 A1 | 12/2004 | Matsui et al. | |
| 2004/0250033 A1 | 12/2004 | Prahlad et al. | |
| 2004/0250034 A1 | 12/2004 | Yagawa et al. | |
| 2005/0015415 A1* | 1/2005 | Garimella et al. | 707/204 |
| 2005/0071710 A1* | 3/2005 | Micka et al. | 714/6 |
| 2005/0246376 A1* | 11/2005 | Lu et al. | 707/104.1 |
| 2005/0251633 A1* | 11/2005 | Micka et al. | 711/162 |
| 2006/0112243 A1* | 5/2006 | McBride et al. | 711/162 |
| 2006/0179082 A1* | 8/2006 | Boyd et al. | 707/203 |

OTHER PUBLICATIONS

B. Mellish, et al., "Implementing ESS Copy Services on UNIX and Windows NT", IBM Corporation, Document No. SG24-5757-00, Apr. 7, 2000, Chapters 1-4.
K. Smith, "Have You Ever Wondered What FlashCopy is and What it Can be Used For?", Mainstar Software Corporation, Document No. 000-0176-01, May 14, 2003, pp. 1-4.
"Common Information Model (CIM) Infrastructure Specification", Distributed Management Task Force, Inc., Document No. DSP0004, Version 2.3 Preliminary, Aug. 11, 2004.
C. Brooks, et al., "IBM TotalStorage: Introducing the SAN File System", IBM Corporation, Document No. SG24-7057-02, Dec. 2004.

* cited by examiner

Primary Examiner—Reginald G Bragdon
Assistant Examiner—Aracelis Ruiz
(74) Attorney, Agent, or Firm—David W. Victor; Konrad Raynes and Victor LLP

(57) ABSTRACT

Provided are a method, system, and program for copying storage units and related metadata to storage. A user data storage location includes user data and a metadata storage location includes metadata data for the user data. A first type of copy operation is performed to copy at least one specified storage unit having user data to at least one copy of the at least one specified storage unit. A second type of copy operation is performed to copy metadata for the at least one specified storage unit being copied to a copy of the metadata for the copied at least one file set.

21 Claims, 5 Drawing Sheets

COPYING STORAGE UNITS AND RELATED METADATA TO STORAGE

BACKGROUND OF THE INVENTION

1. Field of the Invention

The present invention relates to a method, system, and program for copying file sets and related metadata to storage.

2. Description of the Related Art

In a distributed file system, clients share a global namespace addressing storage locations on distributed storage devices. A central server manages the distributed file namespace for the clients. For instance, a metadata server cluster comprised of multiple server devices may maintain the global namespace of a distributed file system stored in different storage pools for the clients. The global namespace is organized into filesets, which comprise file system directories and folders accessible to the clients for file operations. On the clients, the global namespace appears as a hierarchical file directory provided by the operating system running on the client. The clients would access the file metadata maintained by the metadata server when accessing the user data. Further details of a distributed file system using metadata servers is described in the International Business Machines Corporation ("IBM") publication "IBM Total Storage: Introducing the SAN File System", document no. SG24-7057-02 (December 2004).

To backup and copy data in a storage system, the storage locations including the file sets of the user data to copy and the metadata for the file sets, may be copied by first halting all operations to the data to copy to ensure that the data is consistent as of a point-in-time, copying all the data to a backup location and then resume processing to the data to which operations were halted after completing the copying of all the data. File sets may be copied as part of a volume level copy or a file level point-in-time copy, such that only specified files or data blocks are subject to the point-in-time copy operation.

The drawback of this technique is that the data subject to the copying is unavailable during the copy operation, which can take a relatively long time to complete, especially for enterprise systems which require continuous availability of user data.

Another copy option for copying user data is to perform a FlashCopy® operation. FlashCopy® is a registered trademark of IBM. A FlashCopy operation involves creating a data structure indicating a relationship between the source and target data to copy, and then after the relationship is established by creating the data structure, allowing access to the underlying data before the data is actually copied. The Flash-Copy operation may specify that the point-in-time copy operation is performed with respect to a volume.

SUMMARY

Provided are a method, system, and program for copying storage units and related metadata to storage. A user data storage location includes user data and a metadata storage location includes metadata data for the user data. A first type of copy operation is performed to copy a at least one specified storage unit having user data to at least one copy of the at least one specified storage unit. A second type of copy operation is performed to copy metadata for the at least one specified storage unit being copied to a copy of the metadata for the copied at least one file set.

In a further embodiment, a first copy operation is performed to copy at least one storage unit in the user data storage locations to the copy of the at least one storage unit by generating a copy data structure indicating data blocks in the at least one storage unit to provide a point-in-time copy of the at least one storage unit and copying the data blocks to the copy of the at least one storage unit indicated in the first copy data structure. A second copy operation is performed to copy metadata for the at least one storage unit being copied to a copy of the metadata for the copied at least one storage unit to provide a point-in-time copy of the metadata and copying the data blocks comprising the metadata to the copy of the metadata indicated in the second copy data structure

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
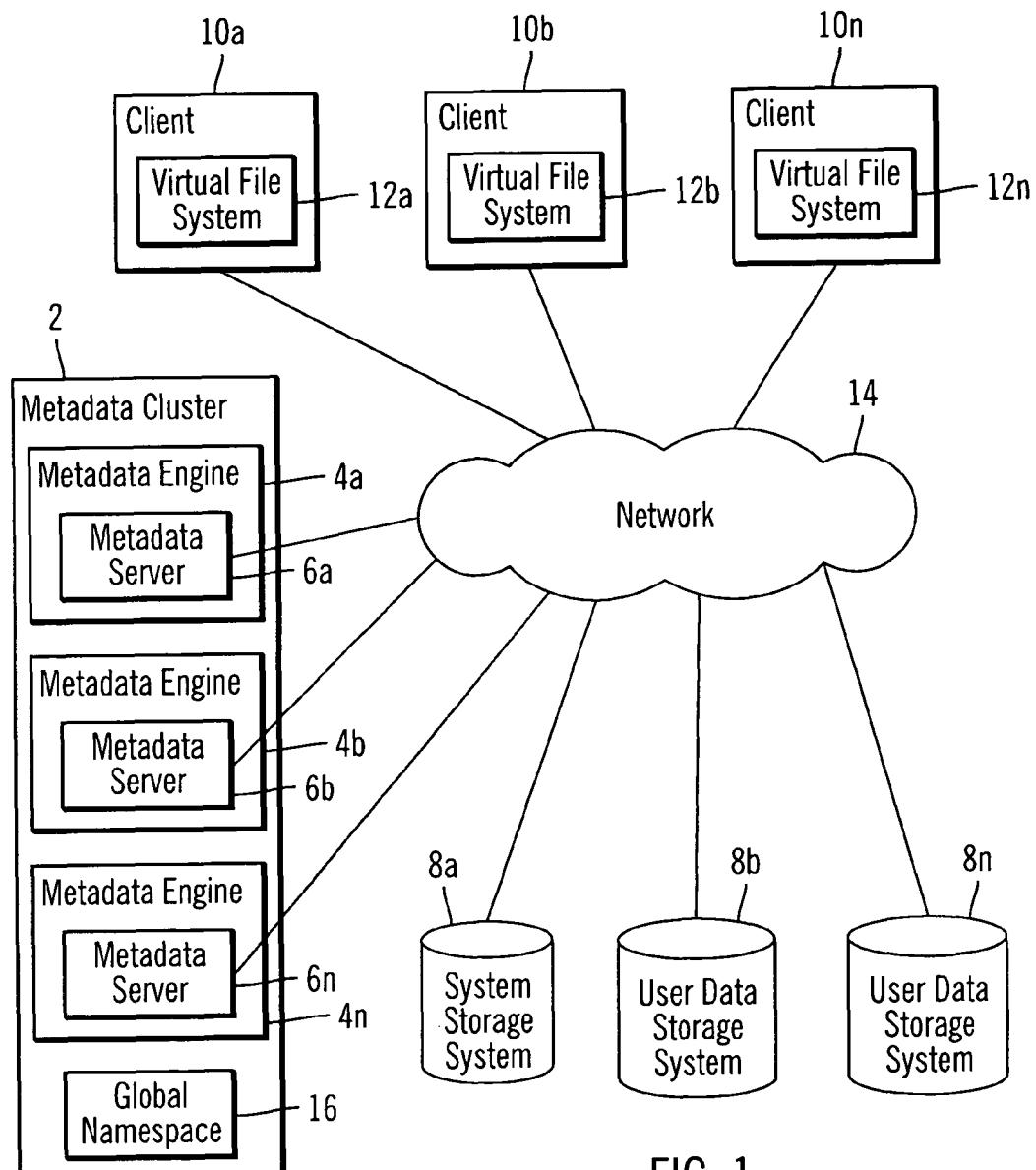
FIG. 1 illustrates a network computing environment in which embodiments are implemented.

FIG. 1 illustrates a distributed file system computing environment in accordance with embodiments. A metadata cluster 2 includes a plurality of metadata engines 4a, 4b ... 4n that include metadata server programs 6a, 6b ... 6n to manage a global namespace referencing files stored in user data storage systems 8b ... 8n. The metadata cluster 2 manages the client 10a, 10b ... 10n access to filesets defined in the global namespace. Each client 10a, 10b ... 10n includes a client virtual file system 12a, 12b ... 12n that interfaces the clients 10a, 10b ... 10n with those filesets in the global namespace the client may access. The metadata cluster 2, clients 10a, 10b ... 10n, and storage systems 8a, 8b ... 8n communicate over a network 14. The variable "n" indicates any number of elements and may have different values when used with different elements.

The metadata engines 4a, 4b ... 4n may comprise server class systems. Each metadata engine 4a, 4b ... 4n may be assigned to handle particular filesets in the global namespace, such that the workload of the global namespace is distributed across the metadata engines 4a, 4b ... 4n. The filesets appear to the clients 10a, 10b ... 10n as standard directories and folders in a hierarchical file system. The metadata server 6a, 6b ... 6n performs the global namespace management operations and maintains file metadata comprising information on the filesets the clients 10a, 10b ... 10n access and system metadata on the file sets in the system storage system 8a. In alternative embodiments, the metadata servers and the client systems may be located on the same computer device.

The client virtual file systems 12a, 12b ... 12n mounts the filesets the clients 10a, 10b ... 10n may access.

Figure 2:
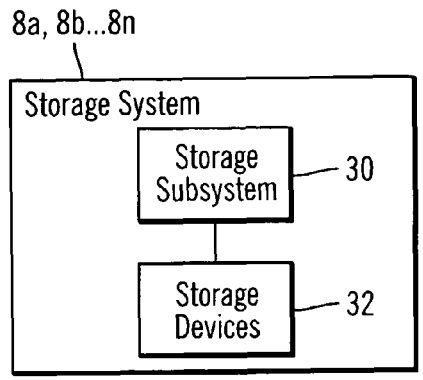
FIG. 2 illustrates an embodiment of a storage system.

FIG. 2 illustrates an embodiment of a storage system 8a, 8b ... 8n as including one or more storage subsystems 30 that manage access to volumes configured in the storage devices 32. In one embodiment, each storage 8a, 8b . . . 8n includes a separate storage subsystem 30 and storage devices 32. In another embodiment, multiple storage systems 8a, 8b . . . 8n may be implemented in one storage subsystem 30 and storage devices 32, or one storage system 8a, 8b . . . 8n may be implemented with one or more storage subsystems having attached storage devices. The storage subsystem 30 may comprise a storage server or an enterprise storage server, such as the IBMS Enterprise Storage Server®. (IBM and Enterprise Storage Server are registered trademarks of IBM). The storage devices 32 assigned to the storage systems 8a, 8b . . . 8n may comprise storage systems known in the art, such as a Direct Access Storage Device (DASD), Just a Bunch of Disks (JBOD), a Redundant Array of Independent Disks (RAID), a virtualization device, tape storage, optical disk storage, or any other storage system known in the art.

In certain embodiments, the user storage systems 8b . . . 8n store the user data in the filesets managed by the metadata cluster 2. The clients 10a, 10 . . . 10n comprise computing devices known in the art, such as a workstation, desktop computer, server, mainframe, handheld computer, telephony device, etc. The network 14 comprises networks known in the art, such as such as a Local Area Network (LAN), Storage Area Network (SAN), Wide Area Network (WAN), InfiniBand, a wireless network, etc. The metadata servers 6a, 6b . . . 6n implement a global namespace 16 implementing a distributed file system comprised of a plurality of file sets that map to storage locations in the user storage systems 8b . . . 8n. As discussed the user storage systems 8b, 8n comprise storage systems and devices connected to the network 14 to store the filesets in the global namespace 16.

Figure 3:
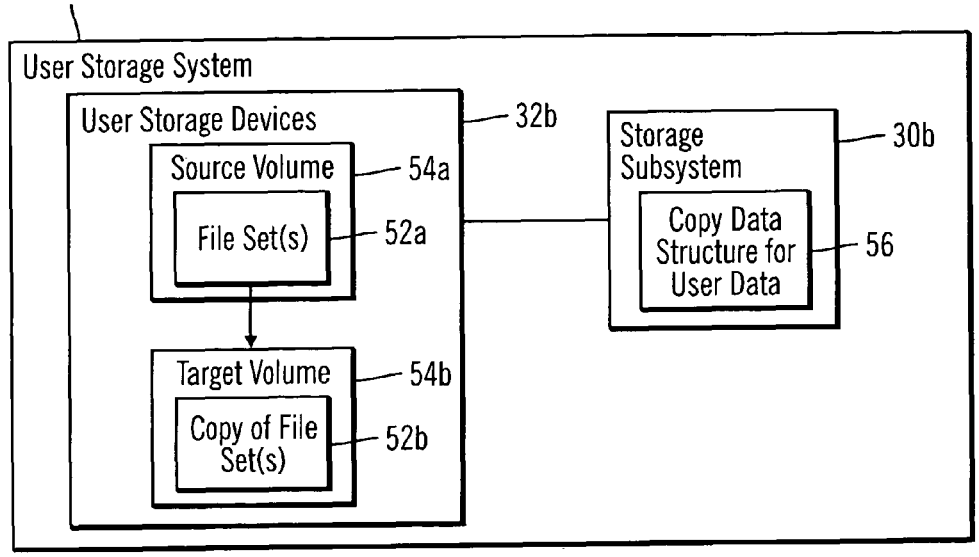
FIG. 3 illustrates an embodiment of a user storage system.

FIG. 3 illustrates an embodiment of one user storage system 8b having a storage subsystem 30b and user storage devices 32b including a source volume 54a having user data file sets 52a that are copied to a target volume 54b including a copy of the user data file sets 52b as part of a copy operation. The other user storage systems 8n may also have data file sets that are subject to copy operations. In one embodiment, the user data file sets 52b are copied within a user storage system 8b . . . 8n without transmitting the data over the network 14 through the clients 10a, 10b . . . 10n or metadata cluster 2. In an alternative embodiment the copy of the file sets 52b may be in a different user data storage system 8b . . . 8n than the file sets 52a that are copied. The storage subsystem 30b managing the storage devices 32b in which the source volume 54a is maintained may further maintain a copy data structure 56 indicating data blocks in the source volume 54a and the target volume 54b subject to a point-in-time copy operation. After creating the copy data structure 56, the storage subsystem 30 may then start copying the data blocks in the source volume 54a to the target volume 54b within the storage system 8b without copying the data over the network 14 through clients 10a, 10b . . . 10n or the metadata cluster 2. Any subsequent updates to data blocks in the source 54a or target 54b volumes indicated in the copy data structure 56 as not yet copied are processed by first copying the data blocks to which the request is directed from the source volume 54a to the target volume 54b. After the data has been copied to the target volume 54b, that copied source 54a and target 54b data may be updated and overwritten in place, such as the case with a "normal" write operation. Further, to access data indicated in the copy data structure 56 at the target volume 54b, the data blocks must have been copied from the source volume 54a to the target volume 54b before the data may be accessed. Thus, a read request to target volume 54b data blocks not yet updated with the data from the source volume 54a may trigger the copy operation to allow access after the copy. Once the data has been copied from the source to the target location, the point-in-time relationship for that copied data established by the copy data structure 56 is completed so that file sets at the source and the copy of the file sets at the target may be updated and overwritten in place. One example of such a point-in-time copy operation that creates a copy data structure before copying the data is the IBM FlashCopy® operation. In FlashCopy, bit map data structures for the source and target volumes are created to indicate data blocks in the source and target volumes subject to the copy relationship that have not been copied. A storage unit that is specified for the copy operation may comprise an entire logical volume, specified files, such as non-contiguous files, blocks in the storage or other suitable units of storage known in the art.

In the above described embodiments, the copy operation is specified at the volume level for a volume level copy. In alternative embodiments, the copy operation may be made with respect to different source and target storage units. The storage unit subject to the above described copy operation and indicated in the copy data structure, in addition to being a volume, may also comprise a group of specified files, a list of blocks in storage, a partition, etc.

Figure 4:
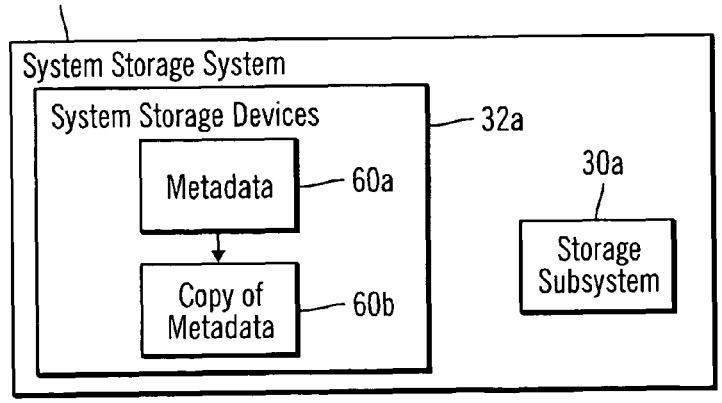
FIG. 4 illustrates an embodiment of a system storage system.

FIG. 4 illustrates how metadata 60a (for the file sets 52a) is copied to a copy of the metadata 60b, such that the copy of the metadata 60b provides the file system metadata to enable clients 10a, 10b . . . 10n to access the copy of the file sets 52b. In one embodiment, the metadata 60a is copied to the copy of the metadata 60b in the system storage system 8a without transferring the metadata over the network 14 through clients 10a, 10b . . . 10n or the metadata cluster 2. In one embodiment, the metadata 60a copied may be only a subset of the data in a volume in the system pool 8a, and other data in that volume may provide metadata for file sets in volumes not subject to the copy operation of FIG. 3. Further, in one embodiment, the metadata 60a may be copied to the copy of the metadata 60b in the system storage system 8a without transferring the metadata over the network 14 through clients 10a, 10b . . . 10n.

Figure 5:
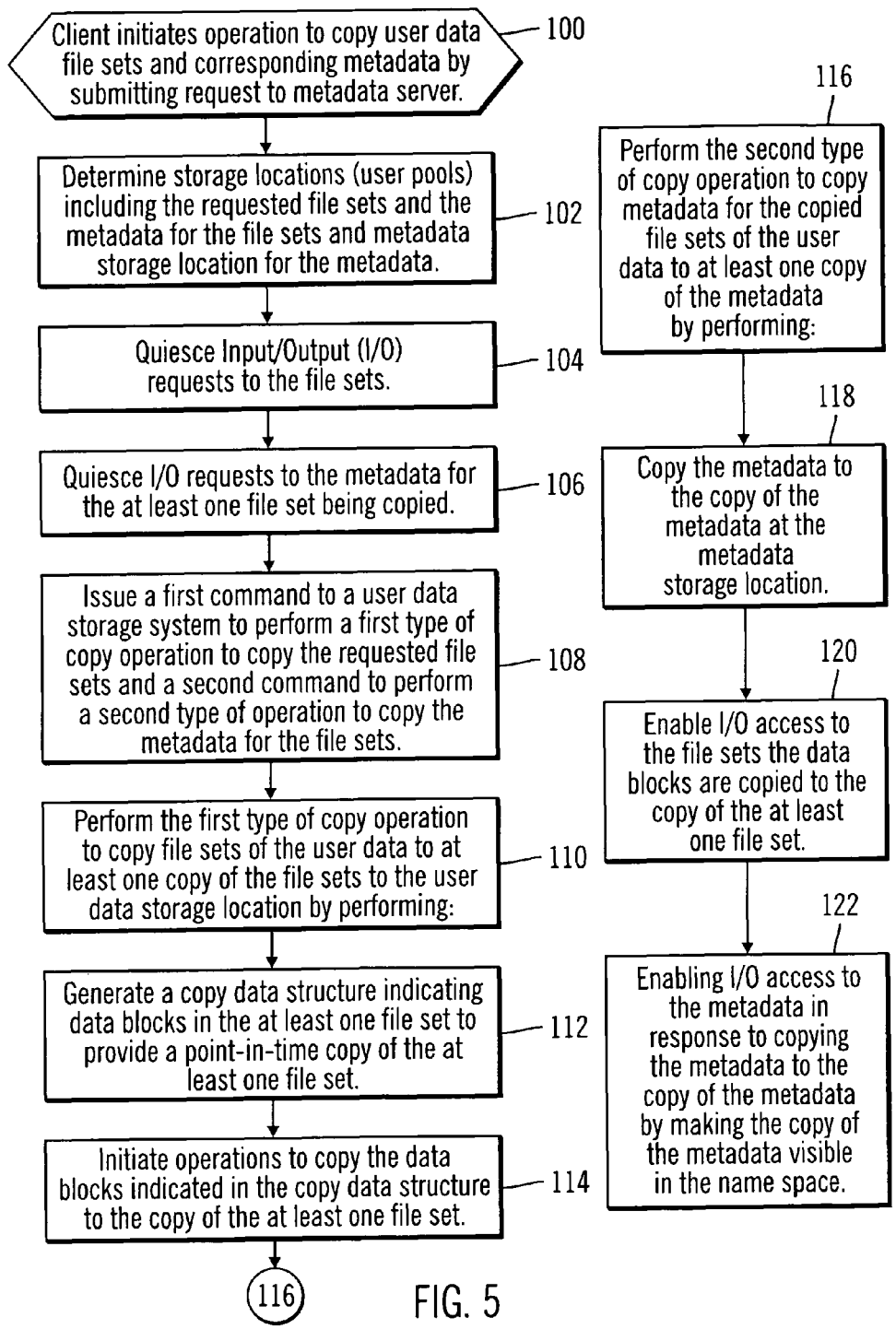
FIG. 5 illustrates an embodiment of operations to copy file sets and metadata in the network computing environment.

FIG. 5 illustrates operations performed by the components in FIG. 1 to copy file sets 52a in a source volume 54a to a target volume 54b (FIG. 3). As discussed, although the copy operation is described with respect to a volume level copy, the copy operation may be performed with respect to other storage unit levels, such as a list of blocks in the storage. Control begins at block 100 with one client 10a, 10b . . . 10n initiating an operation to copy user data file sets 52a and the corresponding metadata 60a. The system executing the client 10a, 10b . . . 10n request, which may comprise a metadata server 6a, 6b . . . 6n receiving the client request or the virtual file system 12a, 12b . . . 12n, determines (at block 102) storage locations in the user storage devices 32b including the requested file sets 52a and the metadata storage location in the system storage devices 32a having metadata 60a for the file sets 52a to copy. The one or more metadata servers 6a . . . 6n quiesce (at block 104) Input/Output (I/O) requests to the file sets 52a (or other storage units) to copy. In one embodiment, the metadata servers 6a . . . 6n may quiesce I/O by contacting each system in FIG. 1 (such as the clients or metadata engines) that access the file sets 52a being copied. Further, any systems (e.g., clients 10a, 10b . . . 10n or metadata engines 4a, 4b . . . 4n) having updates for the file sets 52a to copy will destage their updates to the storage subsystem 30b to make the file sets 52a to copy consistent as of the point-in-time at which the client copy request was initiated. The metadata servers 6a . . . 6n managing access to the system storage devices 30a having the metadata 60a to copy may quiesce (at block 106) I/O requests to the metadata 60a for the file sets 52a being copied.

Either the metadata servers 6a, 6b . . . 6n or client virtual file system 12a, 12b . . . 12n handling the client request submits (at block 108) a first command to the user data storage subsystem 30b to perform a first type of copy operation to copy the requested file sets 52a at the determined user data storage location and a second command to the metadata storage subsystem 30a to perform a second type of copy operation to copy the metadata 60a for the requested file sets 52a. As discussed, the file sets may be in any of the user storage systems 8b . . . 8n. In one embodiment, the first command to copy the user data as part of the first copy operation may comprise a copy operation with respect to a volume or specified file sets. The second command to copy the metadata may comprise an operation to copy a list of blocks comprising the metadata 60a.

The storage subsystem 30b executes (at block 110) the first command to perform the first type of copy operation to copy the file sets 52a to a copy of the file sets 52b by performing the operations at blocks 112 and 114. At block 112, the storage subsystem 30b generates a copy data structure 56 indicating data blocks in the file sets 52a, which are indicated in the copy command, to copy to provide a point-in-time copy of the file set 52a. In one embodiment where the first command is a volume level FlashCopy command, the copy data structure 56 may comprise source volume and target volume bitmaps used in a FlashCopy operation. Alternatively, the copy data structure 56 may identify blocks of data. The storage subsystem 30b then initiates (at block 114) operations to copy the data blocks indicated in the copy data structure 56 to the copy of the file sets 52b.

The storage subsystem 30a managing access to the system storage devices 32a having the metadata 60a may execute the second command to perform (at block 116) the second type of copy operation to copy metadata 60a for the copied file sets 52a of the user data to at least one copy of the metadata 60b at the metadata storage location.

After the copy operations are complete resulting in a point-in-time copy, the metadata servers 6a . . . 6n enable (at block 120) I/O access to the file sets 52a, 52b before the data blocks have been copied to the copy of the file sets 52b. Thus, the system may recognize that the copy operation has completed before the data is actually copied over, where the data may be copied over at a later time or in a background operation. The storage subsystem 30a enables (at block 122) I/O access to the metadata after physically copying the metadata 60a to the copy of the metadata 60b. The copy of the metadata 60b is used to provide the clients 10a, 10b . . . 10n a view of the file system implemented in the user data storage systems 8b . . . 8n. The virtual file system 12a, 12b . . . 12n utilizes the copied metadata to provide the clients 10a, 10b . . . 10n access to the file system implemented in the global name space 16.

In the embodiment of FIG. 5, the file sets 50a and metadata 60a are copied using different types of copy operations. The file sets 50a are copied using a virtual copy technique that initially creates a data structure 56 identifying data blocks in the file sets 50a subject to the copy operation before the data is actually copied so that access to the file sets 52a may be allowed after the copy data structure 56 is created and before the data is copied. This minimizes the time during which the file sets 52a are unavailable. Further, the metadata 60a is copied using a different type of copy operation such as a block by block copy orchestrated by the metadata servers, because in certain embodiments the amount of metadata 60a to copy is substantially less than the corresponding file sets 50a, and thus downtime may not be significant to hold off access to the metadata while the metadata is being copied.

Further, in an embodiment involving a volume level copy, the entire source volume 54a including the file sets 52a is copied. In one such embodiment, the source volume 54a does not include any file set 52a that is not subject to the copy operation. In one embodiment, the metadata 60a copied may comprise a subset of a volume because the volume including the metadata 60a includes metadata for file sets not subject to the copy operation. In such embodiment, the second type of copy operation copies only the list of blocks comprising the metadata 60a from a volume including the metadata for the file sets 52a being copied, and not metadata in the same volume for file sets not subject to the copy operation.

Figure 6:
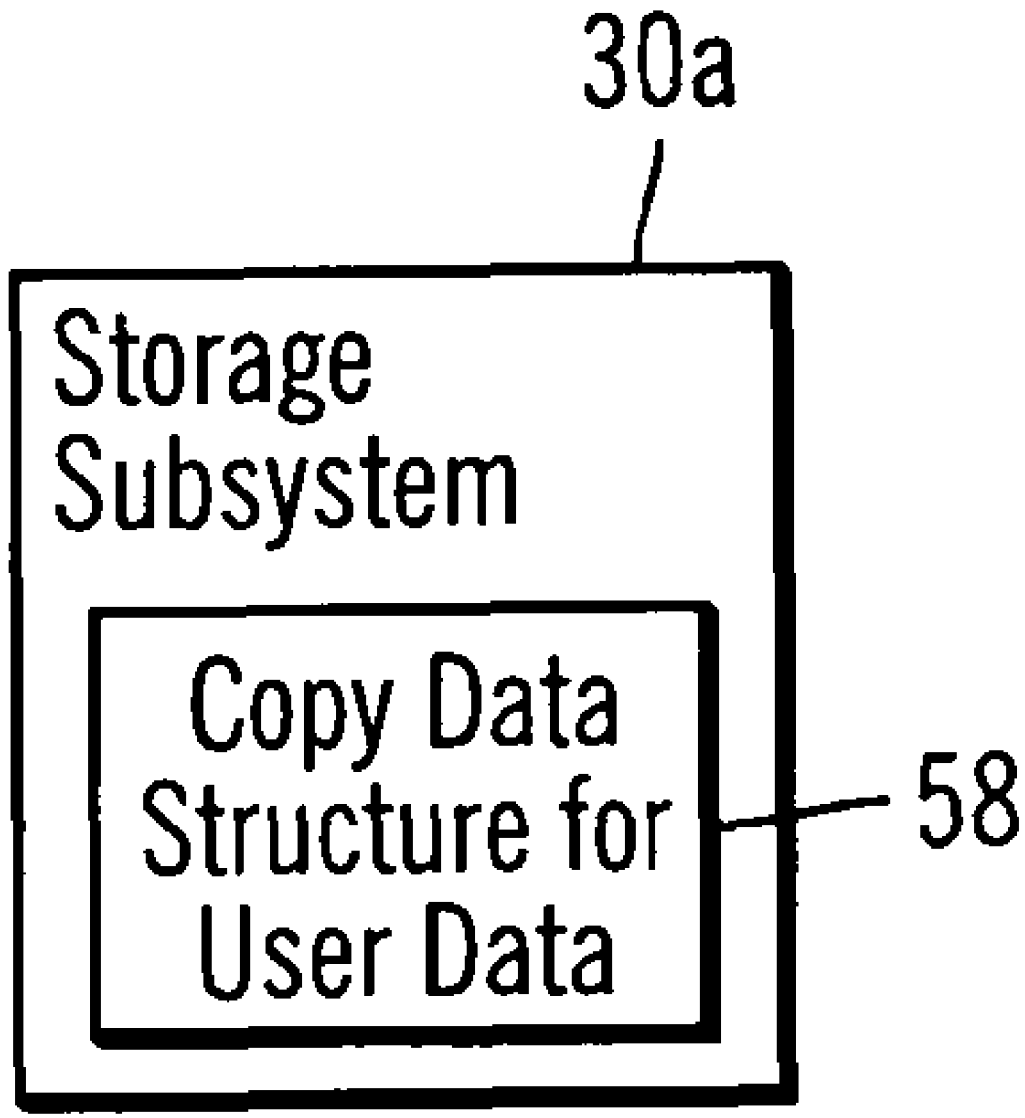
FIG. 6 illustrates an additional embodiment of the system storage subsystem.

FIG. 6 illustrates an embodiment where the metadata servers 6a, 6b . . . 6n for the metadata may generate a copy data structure 58 to perform a point-in-time copy without copying the actual metadata 60a so that access to the metadata 60a can return after the copy data structure 58 is created and before the metadata 60a is copied. In one embodiment, the copy data structure 58 indicates that only the metadata 60a being copied is subject to the relationship, and metadata for file sets other than those being copied in the same volume as the metadata 60a is not indicated in the copy data structure 58 and subject to copying with the metadata 60a.

Figure 7:
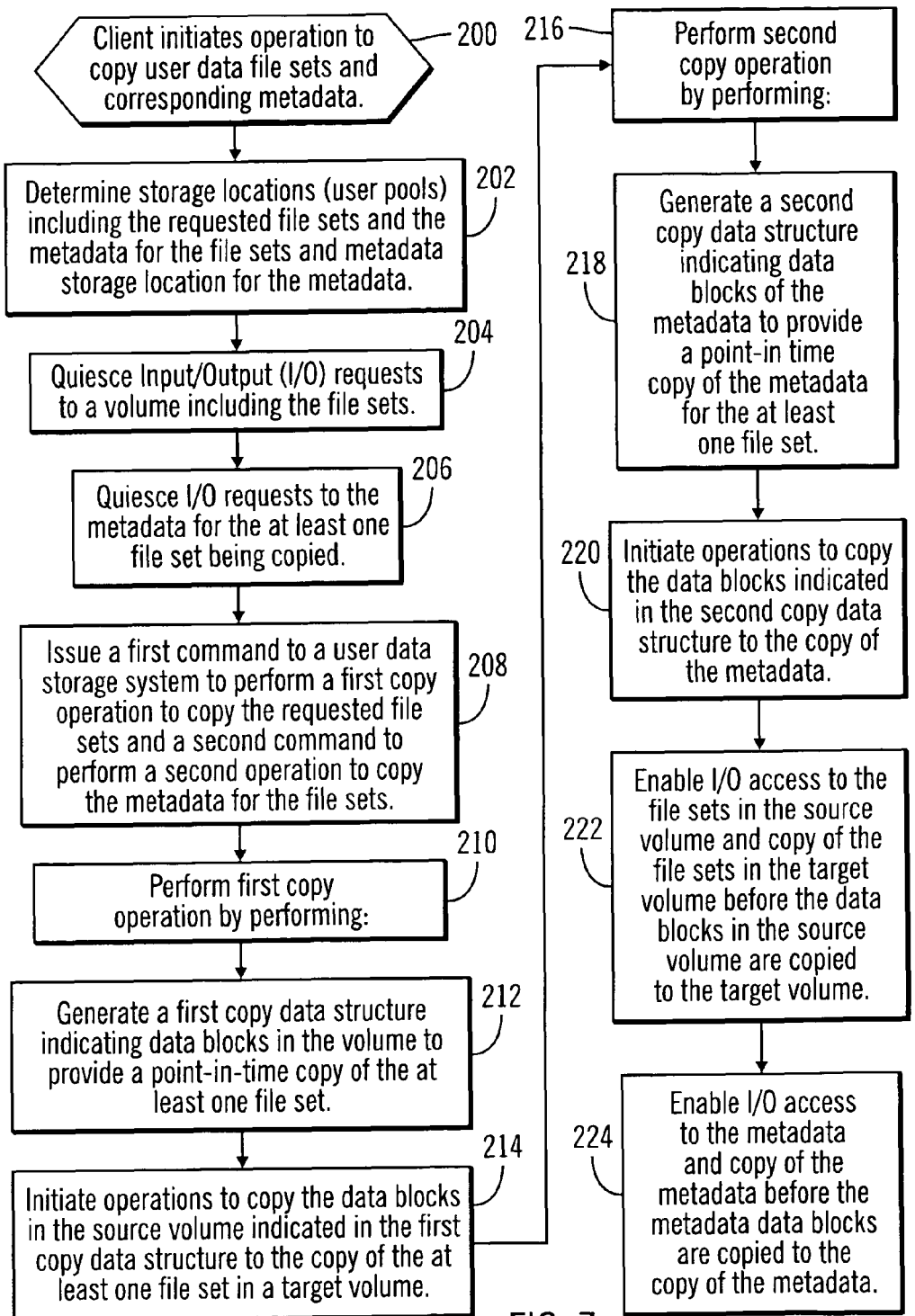
FIG. 7 illustrates an additional embodiment of operations to copy file sets and metadata in the network computing environment.

FIG. 7 illustrates an alternative embodiment of operations performed by the components in FIG. 1 to copy file sets 52a and the related metadata 60a. Control begins at block 200 with one client 10a, 10b . . . 10n initiating an operation to copy user data file sets 52a and the corresponding metadata 60a. The system executing the client 10a, 10b . . . 10n request, which may comprise a metadata server 6a, 6b . . . 6n receiving the client request or the virtual file system 12a, 12b . . . 12n, determines (at block 202) storage locations in the user storage devices 32b including the requested file sets 52a and the metadata storage location in the system storage devices 32a having metadata 60a for the file sets 52a to copy. The metadata servers 6a, 6b . . . 6n quiesce (at block 204) Input/Output (I/O) requests to the file sets 52a to copy. In one embodiment, the metadata servers 6a, 6b . . . 6n may quiesce I/O by contacting each client 10a, 10b . . . 10n accessing the file sets 52a to quiesce. Further, any systems (e.g., clients 10a, 10b . . . 10n or metadata engines 4a, 4b . . . 4n) having updates for the file sets 52a to copy will destage their updates to the storage subsystem 30b to make the file sets 52a to copy consistent as of the point-in-time at which the client copy request was initiated. The metadata servers 6a, 6b . . . 6n further quiesce (at block 206) Input/Output (I/O) requests to the metadata 60a to copy. In one embodiment, the metadata servers 6a, 6b . . . 6n may quiesce I/O by contacting each system in FIG. 1 capable of accessing the metadata 60a to quiesce. Further, any systems (e.g., clients 10a, 10b . . . 10n or metadata engines 4a, 4b . . . 4n) having updates for the metadata 60a to copy will destage their updates to the storage subsystem 30b to make the file sets 52a to copy consistent as of the point-in-time at which the client copy request was initiated.

Either the metadata servers 6a, 6b . . . n or client virtual file system 12a, 12b . . . 12n handling the client request issues (at block 208) a first command to the storage subsystem 30b to perform a first copy operation to copy the requested file sets 52a (or other storage unit) at the determined user data storage location and a second command to the metadata storage subsystem 30a to perform a second copy operation to copy the metadata 60a (list of metadata blocks) for the requested file sets 52a. The storage subsystem 30b executes the first command to perform (at block 210) the first copy operation to copy the file sets 52a to a copy of the file sets 52b. In one embodiment, the first copy operation may generate (at block 212) a copy data structure 56 (FIG. 3) indicating data blocks in the file sets 52a to copy to provide a point-in-time copy of the file set 52a. In one embodiment where the first command is a volume level FlashCopy command, the copy data structure 56 may comprise source volume and target volume bitmaps used in a FlashCopy operation. The storage subsystem 30b then initiates (at block 214) operations to copy the data blocks indicated in the copy data structure 56 to the copy of the file sets 52b.

The storage subsystem 30a executes the second command to perform (at block 216) the second copy operation to copy the metadata 60a to a copy of the metadata 60b. The storage subsystem 20a generates (at block 218) a copy data structure 58 (FIG. 6) indicating data blocks in the metadata 60a to copy to provide a point-in-time copy of the metadata 60a, which may comprise less than all data blocks in the volume including the metadata 60a to copy. In one embodiment, the copy data structure 58 may comprise source and target bitmaps used in a FlashCopy operation. The storage subsystem 30a then initiates (at block 220) operations to copy the data blocks indicated in the copy data structure 58 to the copy of the metadata 60b. The storage subsystem 30b enables (at block 222) I/O access to the file sets 52a, 52b before the data blocks are copied to the copy of the file sets 52b and enables (at block 224) I/O access to the metadata 60a and copy of the metadata 60b before the data blocks are copied to the copy of the metadata 60b.

In the embodiment of FIG. 7, the same virtual copy operation, e.g., FlashCopy, is used to copy both the file sets 54a and metadata 60a to copy, so that access to the file sets 54a and metadata 60a is made available to the systems in FIG. 1 after the copy data structures 56, 58 are established and before the data is actually copied.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The compute readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, a point-in-time copy of the user data was created by creating a copy data structure. In alternative point-in-time copy embodiments, different types of data structures or information may be generated to manage the copy operation than the copy management information described above.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The variable "n" indicates an integer number of instances of an element, and may take different values when used with different elements, such that 56n and 86n may indicate a same or different number of instances of the field information and field authorization, respectively.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The illustrated operations of FIGS. 5 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining user data in a user data storage location implemented in a user data storage system;
maintaining metadata for the user data at a metadata storage location implemented in a metadata storage system, wherein the metadata enables clients access to the user data;
receiving a request to copy at least one specified storage unit having user data to at least one copy of the at least one specified storage unit;
performing a first type of copy operation to copy the at least one specified storage unit having the user data to the at least one copy of the at least one specified storage unit in response to the request to copy, wherein the first type of copy operation allows access to the user data in the at least one copy of the at least one specified storage unit before the user data has been completely copied to the copy of the at least one specified storage unit; and
performing a second type of copy operation, in response to the request to copy, to copy metadata for the at least one specified storage unit being copied to a copy of the metadata for the copied user data, wherein the copy of the metadata provides clients a view of a file system implemented in the user data in the copy of the at least one specified storage unit, wherein the second type of copy operation denies access to the metadata while the metadata is being copied to the to the copy of the metadata, and wherein the first and second types of copy operations comprise different types of copy operations.

2. The method of claim 1, wherein the metadata storage system and the user data storage system are connected to a network, and wherein client systems are connected to the network, wherein the request to copy is issued by one client system further comprising:
issuing, in response to the client system request, a first command to the user data storage system to perform the first type of copy operation; and
issuing, in response to the client system request, a second command to the metadata storage system to perform the second type of copy operation.

3. The method of claim 2, further comprising:
accessing, by the client systems, metadata at a metadata server to determine a user data storage location of the at least one specified storage unit in the storage system;
using, by the client systems, the accessed metadata to access the at least one specified storage unit from the storage system over the network;
accessing, by the client systems, the copy of the metadata for the copied at least one storage unit at the metadata server over the network to determine the storage location of the copied at least one storage unit at the storage system; and
using, by the client systems, the accessed copy of the metadata for the copied at least one storage unit to access the copy of the at least one storage unit from the storage system over the network.

4. The method of claim 1, wherein the first type of copy operation comprises:
generating a copy data structure indicating data blocks in the at least one specified storage unit to provide a point-in-time copy of the at least one specified storage unit; and
copying the data blocks indicated in the copy data structure to the copy of the at least one specified storage unit.

5. The method of claim 4, further comprising:
quiescing Input/Output (I/O) requests to the at least one specified storage unit; and
enabling I/O access to the at least one specified storage unit in response to generating the pointers before the data blocks are copied to the copy of the at least one specified storage unit.

6. The method of claim 1, wherein the second type of copy operation comprises:
quiescing Input/Output (I/O) requests to the metadata for the at least one specified storage unit being copied;
copying the metadata to the copy of the metadata; and
enabling I/O access to the metadata in response to copying the metadata to the copy of the metadata.

7. The method of claim 1, wherein the first copy operation comprises a virtual copy operation in which the copying completes after a data structure is created indicating the data to copy but before the data is copied and wherein the second type of copy operation comprises a block-to-block operation in which the copy operation completes after the data is copied.

8. A method, comprising:
maintaining user data in user data storage locations implemented in a user data storage system;
maintaining metadata for the user data at a metadata storage location implemented in a metadata storage system, wherein the metadata enables clients access to the user data;
receiving a request to copy at least one specified storage unit having user data to at least one copy of the at least one specified storage unit;
performing a first copy operation, in response to the request to copy, to copy the at least one storage unit in the user data storage locations to the copy of the at least one storage unit by generating a first copy data structure indicating data blocks in the at least one storage unit to provide a first point-in-time copy of the at least one storage unit and copying the data blocks to the copy of the at least one storage unit indicated in the first copy data structure; and
performing a second copy operation, in response to the request to copy, to copy metadata for the at least one storage unit being copied to a copy of the metadata for the copied at least one storage unit by generating a second copy data structure indicating blocks in the metadata for the at least one storage unit being copied to provide a second point-in-time copy of the metadata and copying the data blocks comprising the metadata to the copy of the metadata indicated in the second copy data structure, wherein the copy of the metadata provides clients a view of a file system implemented in the user data in the copy of the at least one specified storage unit.

9. The method of claim 8, wherein the at least one storage unit involved in the first copy operation comprises a source volume and the copy of the at least one storage unit comprises a target user data volume, wherein there are no file sets in the source volume not included in the at least one storage unit being copied, wherein the second copy operation copies metadata from a first subset of metadata in one metadata volume, and wherein a second subset of metadata in the metadata volume includes metadata for at least one file set in the user data storage location not subject to the first copy operation.

10. A system in communication with a user data storage location in a user data storage including user data and a metadata storage location in metadata storage including metadata for the user data, comprising:
   a processor;
   a computer readable storage medium including code executed by the processor to perform operations, the operations comprising:
      maintaining the user data in the user data storage location;
      maintaining the metadata for the user data at the metadata storage location, wherein the metadata enables clients access to the user data;
      receiving a request to copy at least one specified storage unit having user data to at least one copy of the at least one specified storage unit;
      performing a first type of copy operation to copy the at least one specified storage unit having the user data to the at least one copy of the at least one specified storage unit in response to the request to copy, wherein the first type of copy operation allows access to the user data in the at least one copy of the at least one specified storage unit before the user data has been completely copied to the copy of the at least one specified storage unit; and
      performing a second type of copy operation in response to the request to copy to copy metadata for the at least one specified storage unit being copied to a copy of the metadata for the copied user data, wherein the copy of the metadata provides clients a view of a file system implemented in the user data in the copy of the at least one specified storage unit, wherein the second type of copy operation denies access to the metadata while the metadata is being copied to the to the copy of the metadata, and wherein the first and second types of copy operations comprise different types of copy operations.

11. The system of claim 10, wherein the metadata storage system and user data storage system are connected to a network, and wherein client systems are connected to the network, wherein the request to copy is issued by one client system, wherein the operations further comprise:
   issuing, in response to the client system request, a first command to the user data storage system to perform the first type of copy operation; and
   issuing, in response to the client system request, a second command to the metadata storage system to perform the second type of copy operation.

12. The system of claim 10, wherein the first type of copy operation comprises:
   generating a copy data structure indicating data blocks in the at least one specified storage unit to provide a point-in-time copy of the at least one specified storage unit; and
   copying the data blocks indicated in the copy data structure to the copy of the at least one specified storage unit.

13. The system of claim 12, wherein the operations further comprise:
   quiescing Input/Output (I/O) requests to the at least one specified storage unit; and
   enabling I/O access to the at least one specified storage unit in response to generating the pointers before the data blocks are copied to the copy of the at least one specified storage unit.

14. The system of claim 10, wherein the second type of copy operation comprises:
   quiescing Input/Output (I/O) requests to the metadata for the at least one specified storage unit being copied;
   copying the metadata to the copy of the metadata; and
   enabling I/O access to the metadata in response to copying the metadata to the copy of the metadata.

15. An article of manufacture comprising a computer readable storage medium having code executed to communicate with a user data storage location in a user data system having user data and a metadata storage location in a metadata storage system having metadata for the user data and to perform operations, the operations comprising:
   maintaining user data in the user data storage location;
   maintaining metadata for the user data at the metadata storage location, wherein the metadata enables clients access to the user data;
   receiving a request to copy at least one specified storage unit having user data to at least one copy of the at least one specified storage unit;
   performing a first type of copy operation to copy the at least one specified storage unit having the user data to the at least one copy of the at least one specified storage unit in response to the request to copy, wherein the first type of copy operation allows access to the user data in the at least one copy of the at least one specified storage unit before the user data has been completely copied to the copy of the at least one specified storage unit; and
   performing a second type of copy operation, in response to the request to copy, to copy metadata for the at least one specified storage unit being copied to a copy of the metadata for the copied user data set, wherein the copy of the metadata provides clients a view of a file system implemented in the user data in the copy of the at least one specified storage unit, wherein the second type of copy operation denies access to the metadata while the metadata is being copied to the to the copy of the metadata, and wherein the first and second types of copy operations comprise different types of copy operations.

16. The article of manufacture of claim 15, wherein the metadata storage system and user data storage system are connected to a network, and wherein client systems are connected to the network, wherein the request to copy is issued by one client system, further comprising:
   issuing, in response to the client system request, a first command to the user data storage system to perform the first type of copy operation; and issuing, in response to the client system request, a second command to the metadata storage system to perform the second type of copy operation.

17. The article of manufacture of claim 15, wherein the first type of copy operation comprises:

generating a copy data structure indicating data blocks in the at least one specified storage unit to provide a point-in-time copy of the at least one specified storage unit; and copying the data blocks indicated in the copy data structure to the copy of the at least one specified storage unit.

18. The article of manufacture of claim 15, wherein the second type of copy operation comprises:

quiescing Input/Output (I/O) requests to the metadata for the at least one specified storage unit being copied;

copying the metadata to the copy of the metadata; and enabling I/O access to the metadata in response to copying the metadata to the copy of the metadata.

19. The article of manufacture of claim 15, wherein the first copy operation comprises a virtual copy operation in which the copying completes after a data structure is created indicating the data to copy but before the data is copied and wherein the second type of copy operation comprises a block-to-block operation in which the copy operation completes after the data is copied.

20. An article of manufacture comprising a computer readable storage medium having code executed to communicate with a user data storage location in a user data system having user data and a metadata storage location in a metadata storage system having metadata for the user data and to perform operations, the operations comprising:

maintaining the user data in the user data storage locations;

maintaining metadata for the user data at the metadata storage location, wherein the metadata enables clients access to the user data;

receiving a request to copy at least one specified storage unit having user data to at least one copy of the at least one specified storage unit;

performing a first copy operation, in response to the request to copy, to copy the at least one storage unit in the user data storage locations to the copy of the at least one storage unit by generating a first copy data structure indicating data blocks in the at least one storage unit to provide a first point-in-time copy of the at least one storage unit and copying the data blocks to the copy of the at least one storage unit indicated in the first copy data structure; and performing a second copy operation, in response to the request to copy, to copy metadata for the at least one storage unit being copied to a copy of the metadata for the copied at least one storage unit by generating a second copy data structure indicating blocks in the metadata for the at least one storage unit being copied to provide a second point-in-time copy of the metadata and copying the data blocks comprising the metadata to the copy of the metadata indicated in the second copy data structure, wherein the copy of the metadata provides clients a view of a file system implemented in the user data in the copy of the at least one specified storage unit.

21. The article of manufacture of claim 20, wherein the at least one storage unit involved in the first copy operation comprises a source volume and the copy of the at least one storage unit comprises a target user data volume, wherein there are no file sets in the source volume not included in the at least one storage unit being copied, wherein the second copy operation copies metadata from a first subset of metadata in one metadata volume, and wherein a second subset of metadata in the metadata volume includes metadata for at least one file set in the user data storage location not subject to the first copy operation.

* * * * *